(12) United States Patent
Harwood et al.

(10) Patent No.: US 6,910,705 B1
(45) Date of Patent: Jun. 28, 2005

(54) TRAILER HITCH RECEIVER COVER

(76) Inventors: Cary J. Harwood, P.O. Box 524, Union, MI (US) 49130; Samuel M. Adams, P.O. Box 524, Union, MI (US) 49130; Beverly T. Adams, P.O. Box 524, Union, MI (US) 49130; Terrence P. McGrath, P.O. Box 524, Union, MI (US) 49130; William P. Pleasants, III, P.O. Box 524, Union, MI (US) 49130

( * ) Notice: Subject to any disclaimer, the term of this patent is extended or adjusted under 35 U.S.C. 154(b) by 71 days.

(21) Appl. No.: 10/453,315

(22) Filed: Jun. 3, 2003

(51) Int. Cl.[7] .................................................. B60D 1/28
(52) U.S. Cl. ........................ 280/507; 362/459; 40/591; 40/575
(58) Field of Search ........................ 280/507; 362/459, 362/487; 40/591, 643, 544, 575

(56) References Cited

U.S. PATENT DOCUMENTS

| | | | |
|---|---|---|---|
| 5,005,306 A | * | 4/1991 | Kinstler ...................... 362/486 |
| 5,603,178 A | | 2/1997 | Morrison |
| 5,979,094 A | | 11/1999 | Brafford |
| D419,505 S | | 1/2000 | Deerman |
| 6,019,386 A | * | 2/2000 | Morelock ................... 280/507 |
| D426,798 S | | 6/2000 | Peroni |
| 6,079,136 A | | 6/2000 | Kozlarek |
| D430,519 S | | 9/2000 | Beauvais |
| 6,199,892 B1 | | 3/2001 | Dahl |
| 6,247,257 B1 | * | 6/2001 | Powell ........................ 40/591 |
| D450,638 S | | 11/2001 | Calderon |
| D458,195 S | | 6/2002 | Beauvais |
| 6,412,202 B1 | | 7/2002 | Oswood |
| 6,439,595 B1 | * | 8/2002 | Cheng et al. ............... 280/507 |
| D464,919 S | | 10/2002 | Pichan |
| 6,463,686 B1 | | 10/2002 | Eisenbraun |
| 6,553,697 B1 | * | 4/2003 | Pichan ........................ 40/591 |
| 2002/0125686 A1 | * | 9/2002 | Blake ......................... 280/507 |
| 2003/0121192 A1 | * | 7/2003 | McPheters ................... 40/591 |

* cited by examiner

Primary Examiner—Kevin Hurley

(57) ABSTRACT

A cover for a hitch receiver includes a removable cover plate, which may incorporate a theft deterrent design and may be illuminated by an electroluminescent sheet.

17 Claims, 7 Drawing Sheets

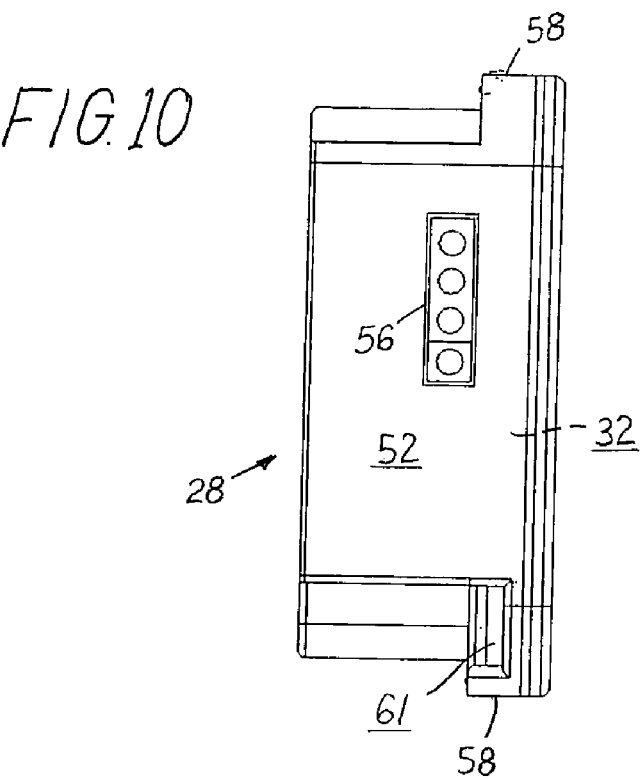
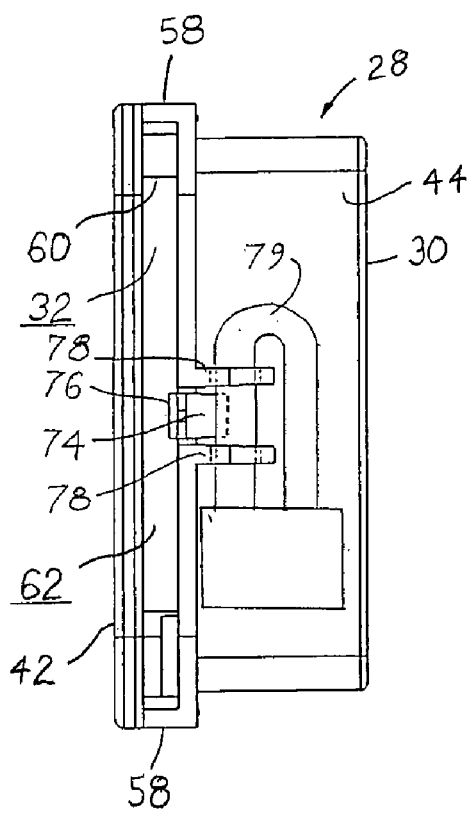
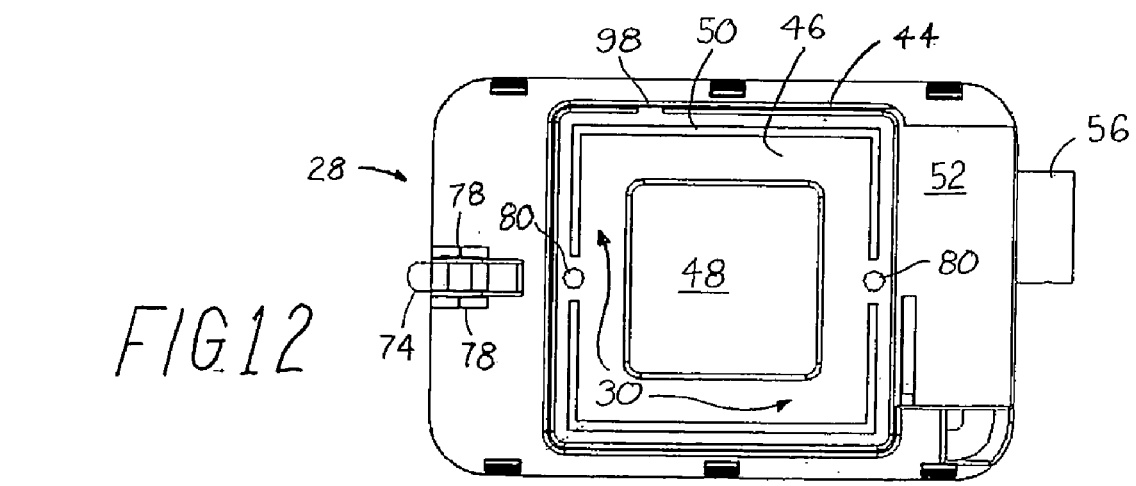

TRAILER HITCH RECEIVER COVER

FIELD OF THE INVENTION

The invention disclosed herein relates to a cover for a vehicle tow hitch receiver. More specifically, the invention includes a cover adaptable to be received by a hitch receiver and capable of removably carrying signage.

BACKGROUND OF THE INVENTION

Hitch assemblies for vehicles such as trucks generally include a hitch bar that is removably insertable into a hitch receiver carried by the vehicle. The hitch receiver generally includes a length of rectangular steel tube stock longitudinally oriented and connected to the frame under the rear of the vehicle. The hitch assembly generally includes a hitch bar that carries a hitch ball or clevis and which fits into the end of the receiver. The hitch bar is then releasably locked in place with a pin that is inserted through complimentary holes in the receiver tube and the hitch bar. It is desirable to cover the end of the receiver when the hitch bar is not inserted within the receiver to prevent unwanted dirt and debris from becoming lodged in the receiver. These covers are often stylized to reflect some sentiment of the owner.

Many hitch receiver covers are known. Some are as simple as a cap that fits over the end of the receiver. Others include decorative plates. Still others include interchangeable decorative plates with electric backlighting behind the plates. A problem with receiver covers, however, is they are often subject to theft. Therefore, it would be desirable to have an attractive receiver cover that includes simple anti-theft features to make it more difficult to remove from a receiver.

SUMMARY OF THE INVENTION

A cover for a hitch receiver that may be mounted to the end of a hitch receiver is disclosed. The cover includes a mounting socket and a removable cover plate carried by the mounting socket. The mounting socket may be fastened to the receiver with a fastener accommodated within a chamber in the mounting socket such that the cover plate overlies the chamber and fastener. The cover plate may also include an electroluminescent sheet to illuminate the cover plate when connected to the power supply of the vehicle. Further, the cover may be adapted to allow a hitch bar to be inserted through the mounting socket and the cover plate into the hitch receiver.

One object of the invention is to provide an attractive hitch receiver cover with anti-theft features. Another object of the invention is to provide a receiver cover that may be used both with and without a hitch bar inserted into the receiver. Yet another object of the invention is to provide a receiver cover that is illuminated.

BRIEF DESCRIPTION OF THE DRAWINGS

These and other aspects of the invention will be apparent from the following description, with reference to the accompanying drawings, in which:

FIG. 10 is a left side view of the receiver cover of FIG. 8;

FIG. 11 is a right side view of the receiver cover of FIG. 8;

FIG. 12 is a back view of the receiver cover of FIG. 8;

DETAILED DESCRIPTION

Figure 1:
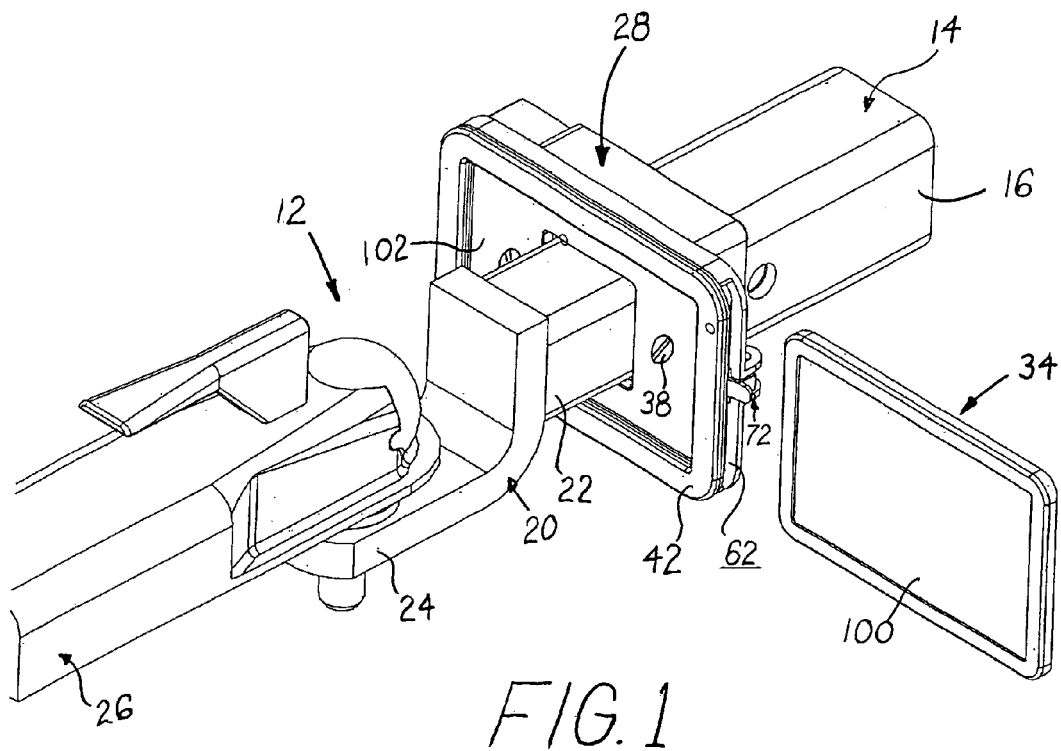
FIG. 1 is an isometric view of a receiver cover mounted about the end of a hitch receiver.

Referring to the drawings, a hitch assembly 12 is shown for connection to a vehicle (not shown). The hitch assembly 12 includes a receiver 14 having tube section 16 with a lip 18 around the end of the tube section. Receiver 14 is connected to the frame of the towing vehicle. A hitch bar 20 includes a tube section 22 that fits into receiver tube section 16. A tongue 24 on the opposite end of hitch bar 20 carries a hitch ball 25 which is used for attachment to a hitch 26 connected to the towed trailer.

Figure 2:
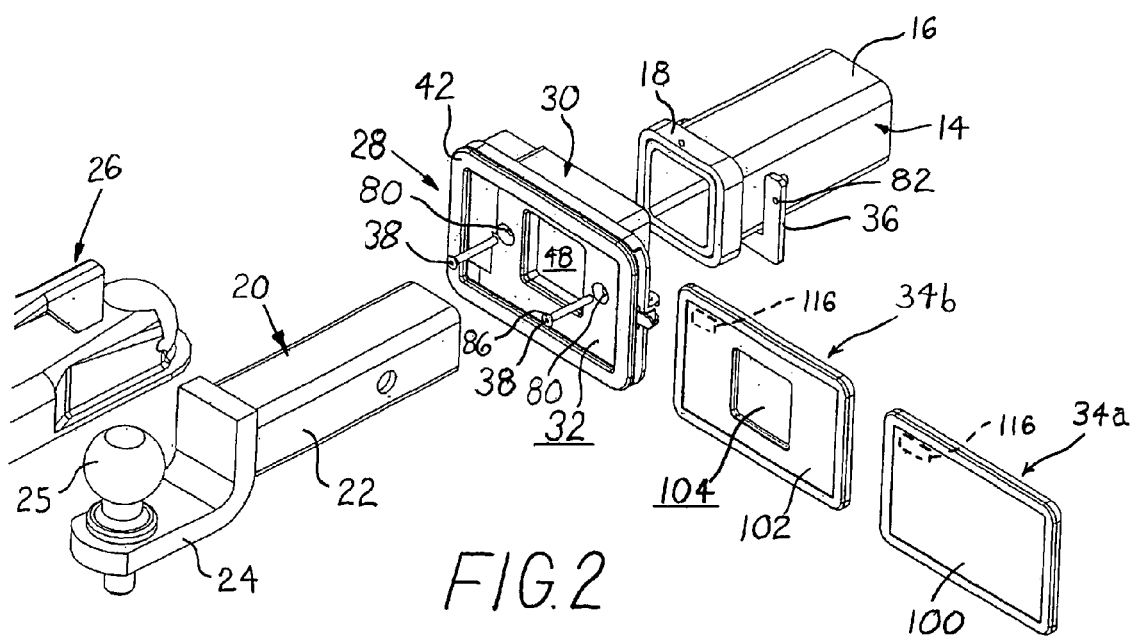
FIG. 2 is an exploded isometric view of the cover components of the FIG. 1.
Figure 2A:
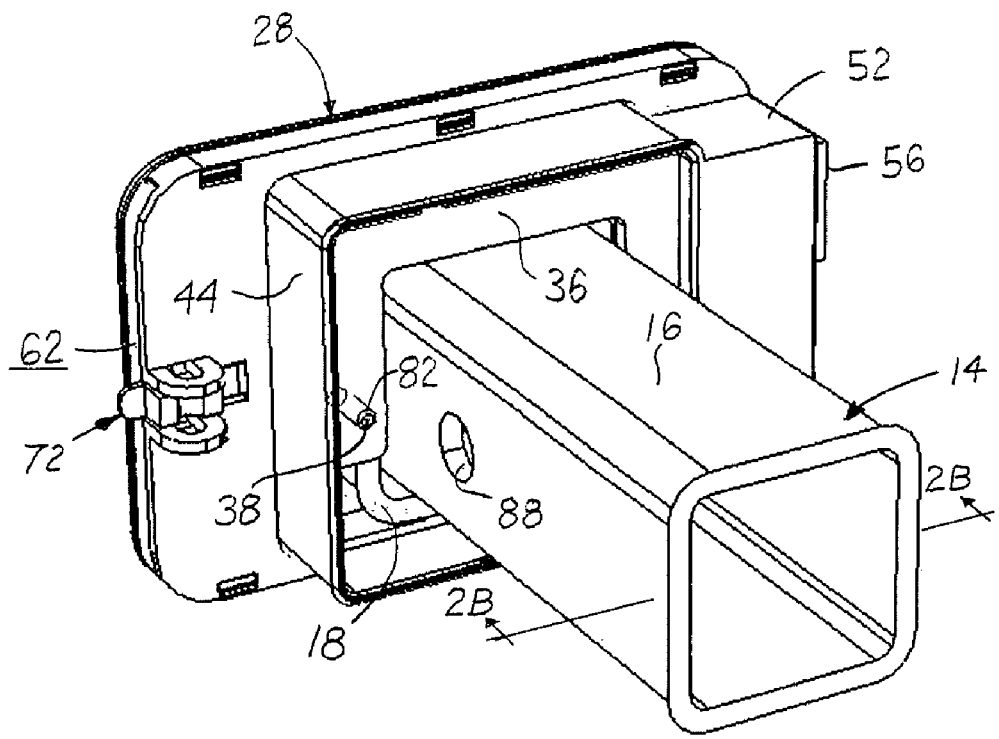
FIG. 2A is an isometric view of the rear of the cover of FIG. 1 mounted to a receiver.
Figure 2B:
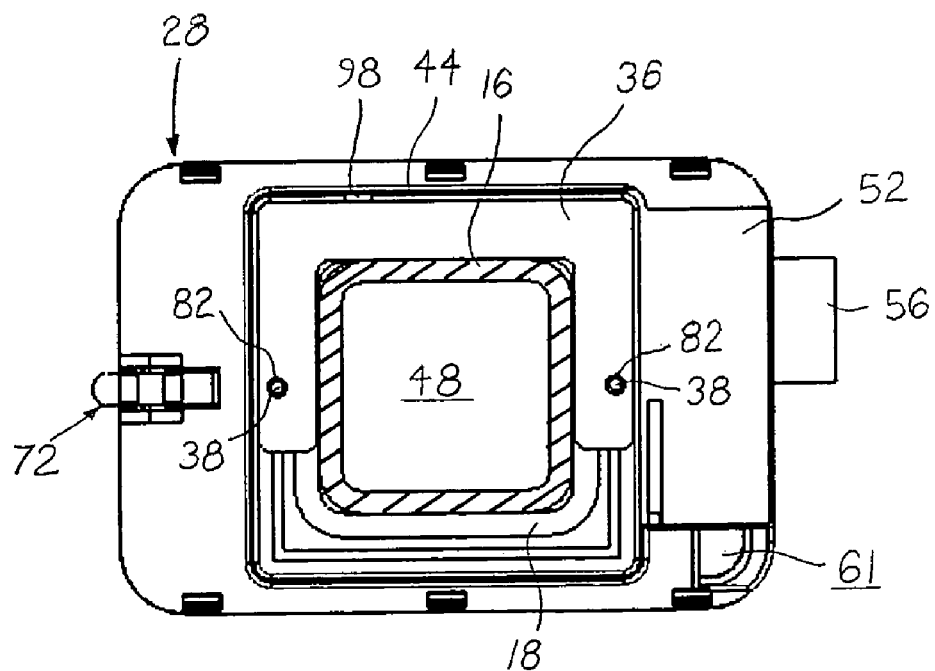
FIG. 2B is a cross sectional view of the cover of FIG. 2A along the line 2B—2B.
Figure 4:
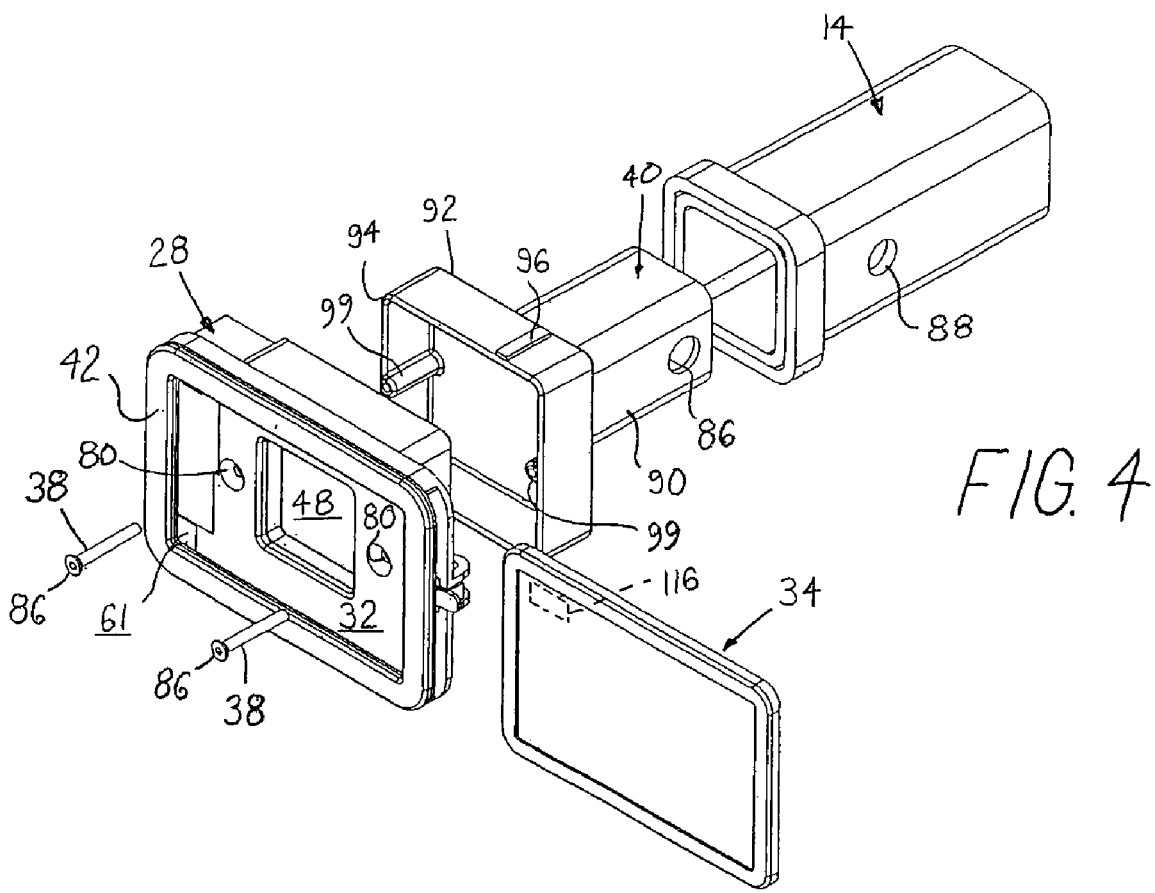
FIG. 4 is an exploded isometric view of the receiver cover of FIG. 3.
Figure 3:
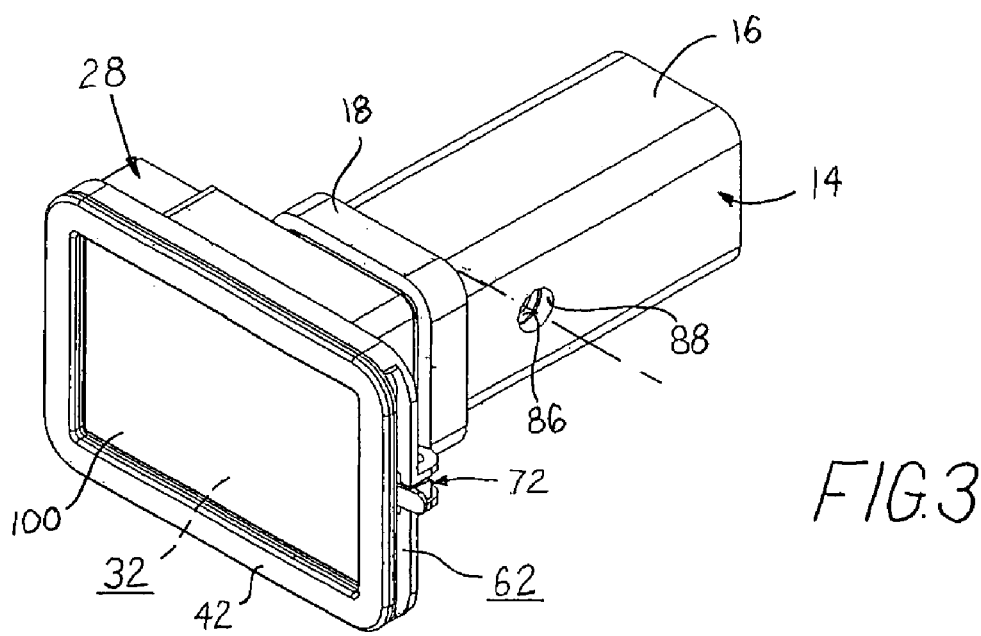
FIG. 3 depicts the cover of FIG. 1 but installed in the end of the receiver using an adaptor.
Figure 5:
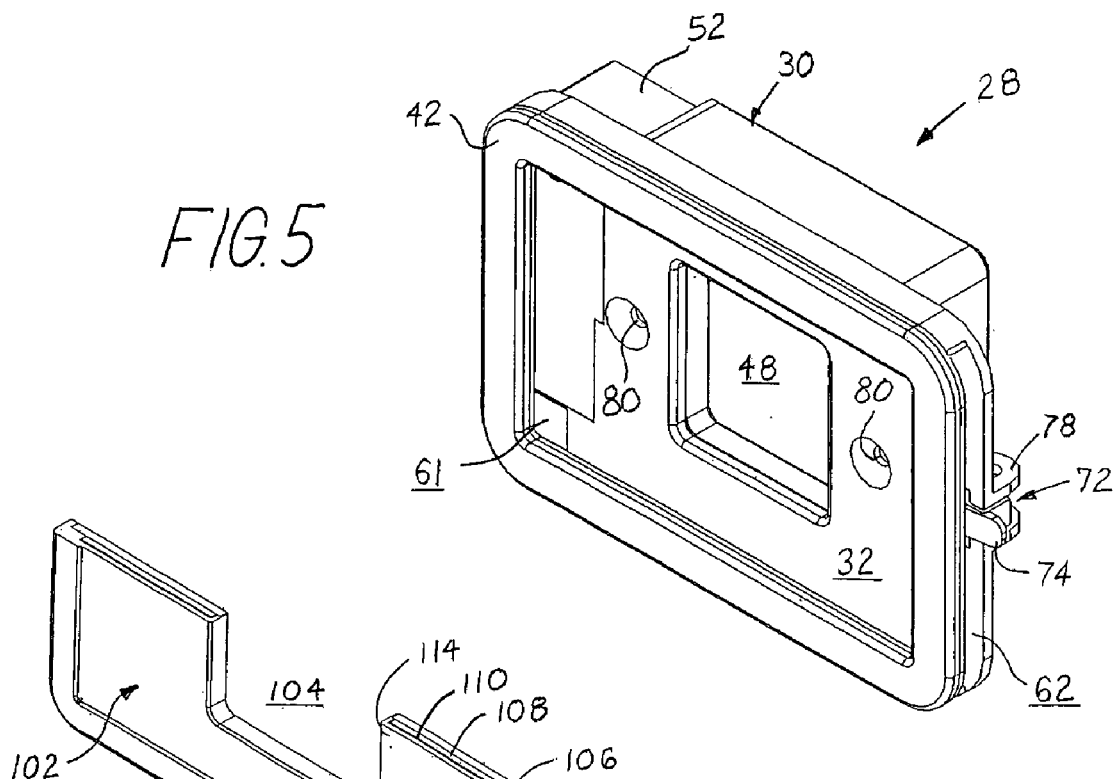
FIG. 5 is an isometric view of the receiver cover in isolation.

A receiver cover 28 is mounted on the end of the receiver 14. Receiver cover 28 includes a mounting socket 30 carrying a cover plate chamber 32 into which a removable cover plate 34a, b is inserted. Receiver cover 28 may be mounted directly about the end of receiver 14 as shown in FIGS. 1 and 2 using a mounting bracket 36 and fasteners 38 as shown in FIGS. 2A and 2B and hereinafter described. Alternatively, receiver cover 28 may be mounted to receiver 14 as shown in FIGS. 3 and 4 using an adaptor 40 and fasteners 38. Illumination panels 42 about the periphery of receiver cover 28 are wired to work in conjunction with brake and turn signal lights as hereinafter discussed.

As seen in FIGS. 8–12, mounting socket 30 and peripheral illumination panel 42 are generally of single piece construction. Mounting socket 30 includes a sidewall 44 formed to fit about the end of receiver 14 at lip 18. A back wall 46 extends across one end of sidewall 44 and has a centrally located access hole 48 therein to allow hitch bar tube section 22 to be inserted through the access hole and into receiver 14. A rib 50 protrudes from back wall 46 and is centrally spaced from sidewall 44 to either guide adaptor 40 into socket 30, when used, or space receiver cover 28 away from the end of receiver 14 when directly mounted thereon. A chamber 52 in which electronic components such as control wiring and a 4-flat electric connector 56 are located is formed next to socket 30. Connector 56 may be any suitable electrical connector as necessary for creating an electrical connection with the power system on the towing vehicle. The wiring includes any necessary configuration for activating lighting systems described in detail later.

Cover plate chamber 32 is located on the opposite side of back wall 46 from mounting socket 30. Chamber 32 includes a sidewall 58 around the periphery of back wall 46. A groove 60 is formed within sidewall 58 around the entire periphery of chamber 32. A slot 62 through sidewall 58 on one side of chamber 32 allows a cover plate 34a, 34b to be slid through the slot and into the groove 60 spanning chamber 32. An electric connector 64 carried by back wall 46 for providing electric power to cover plate 34a,b is preferably of the type including a pair of resilient terminals that will allow cover plate 34a,b to be slid across the terminals. An opening 61 in sidewall 58 forms an access area into cover plate chamber 32 on the side of the chamber opposite slot 62 to facilitate removal of cover plate 34a,b by placing a thumb or finger through the opening to push the plate out of the chamber through the slot.

Illumination panel 42 is carried by sidewall 58 about the periphery of receiver cover 28 for use as turn signals and brake lights. Illumination panel 42 (see FIGS. 9 and 14) includes a printed circuit board 66 mounted to the outer edge of sidewall 58, an electroluminescent sheet 68 mounted over board 66, and a protective lens 70 covering the electroluminescent sheet and board. Preferably the illumination panel is divided into two sections, a left section and a right section with the protective lens 70 colored red in order to allow the panel 42 to be activated as either left and right turn signals or a brake light. Therefore, for example, if a left turn signal is used, the left half of the panel would blink with the turn signal. The right side of panel 42 would similarly blink with the right turn signal. When the brakes are applied, both sides of the panel 42 would illuminate, thereby lighting the entire panel. Panel 42 is connected to the electrical system of vehicle 10 via connector 56, 56a and appropriate control wiring.

A latch 72 carried by backwall 46 is used to releasably lock cover plate 34a,b into chamber 32. Latch 72 includes a resilient barbed tab 74 protruding from backwall 46 that is flexed so as to overlap one end edge of cover plate 34a,b when the plate is inserted into chamber 32. With tab 74 overlapping the end edge of the cover plate, a pin or pad lock 79 can be inserted through a pair of aligned clevis 78 which straddle the tab to secure the cover plate in cover plate chamber 32 (see FIG. 11). The cover plate can be removed from chamber 32, once any pin or lock has been removed, by pressing tab 74 inwardly to free the tab from the cover plate.

Receiver cover 28 may be mounted to the end of receiver 14 in two alternative ways as depicted in FIGS. 1–2B and in FIGS. 3–4. In FIG. 1 receiver cover 28 is mounted directly about lip 18 of receiver tube section 16 by using mounting bracket 36 and fasteners 38. Using this arrangement, sidewall 44 of mounting socket 30 is slid about lip 18. Mounting bracket 36 is then fitted about receiver tube section 16 and moved against lip 18 adjacent mounting socket 30. A pair fasteners holes 80 through backwall 46 correspond with a second set of fastener holes 82 in mounting bracket 36 in order to allow fasteners 38 to be inserted into holes 80 and 82 when aligned. In this arrangement, fasteners 30 are inserted into fastener holes 80 from cover plate chamber 32 and turned into bracket holes 82 to clamp the receiver cover to the receiver as seen in FIG. 2A. Fasteners 38 are preferably self threading screws to obviate the need for a nut on the back end of the screw in order to secure the mounting bracket securely to the mounting socket 30. Thereby the only access for removing the fasteners 38 is through the cover plate chamber 32 to access the heads 86 of the fasteners. By mounting the receiver cover 28 in this manner, hitch bar 20 may be inserted through access hole 48 in backwall 46 of the receiver cover 28 (the cover plate 34a having been previously removed) and into receiver 14, thereby allowing the hitch assembly 12 to be used to tow a trailer 26 without removing the receiver cover 28 from the receiver 14.

The second method of mounting receiver cover 28 to receiver 14 is by using adaptor 40, as shown in FIGS. 3 and 4. Using this set up, receiver cover 28 is mounted to adaptor 40 which is then inserted into receiver tube section 16. Adaptor 40 may then be releasably secured within receiver 14 by inserting a pin (not shown) through alignable pin holes 86, 88 in the receiver tube section and adaptor tube 90. The adaptor includes an adaptor plug 92 on the end of an adaptor tube 90. Adaptor plug 92 includes a peripheral sidewall 94 sized to fit within mounting socket 30 between sidewall 44 and spacer rib 50. A key 96 on adaptor sidewall 94 is complementary to a key way 98 formed within mounting socket sidewall 44 and is used for proper mating of the adaptor plug to the mounting socket. When properly mated, screw blocks 99 within adaptor plug 92 are aligned with fastener holes 80 in mounting socket 30 such that fasteners 38 may be threaded into the screw blocks to releasably mount the receiver cover to the adaptor 40. Again, as with the mounting bracket, the only access for removing the fasteners 38 is through the cover plate chamber 32 with cover plate 34a,b removed. When receiver cover 28 is thus installed onto receiver 14 using adaptor 40, a hitch bar 20 cannot be inserted into receiver 14 without removing the entire receiver cover and adaptor assembly from the receiver. This is accomplished by removing the retainer pin from pin holes 88, 86 and sliding the entire receiver cover and adaptor assembly out of the receiver. When it is desired to replace receiver cover 28, adaptor 40 with the attached cover can be re-inserted into the receiver tube section 16 and again secured with a retaining pin.

Figure 6:
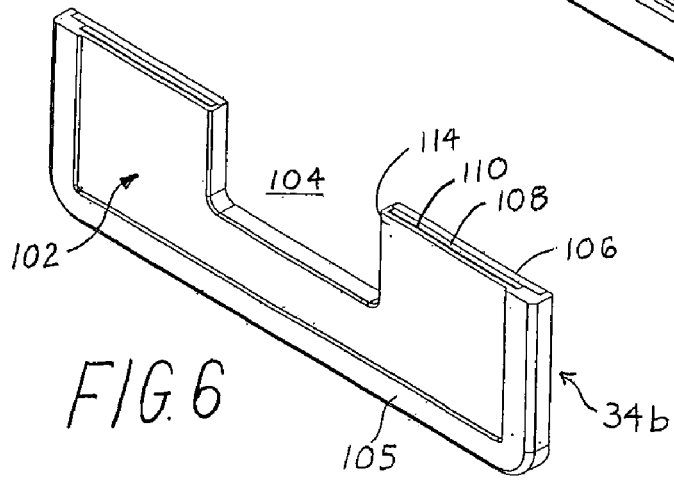
FIG. 6 is a cross section of the cover plate 34a of FIG. 1.
Figure 7:
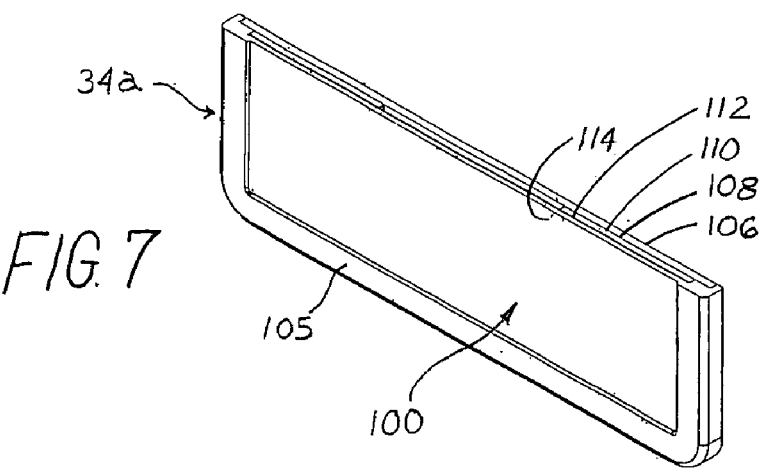
FIG. 7 is a cross section of the cover plate 34b of FIG. 3.
Figure 8:
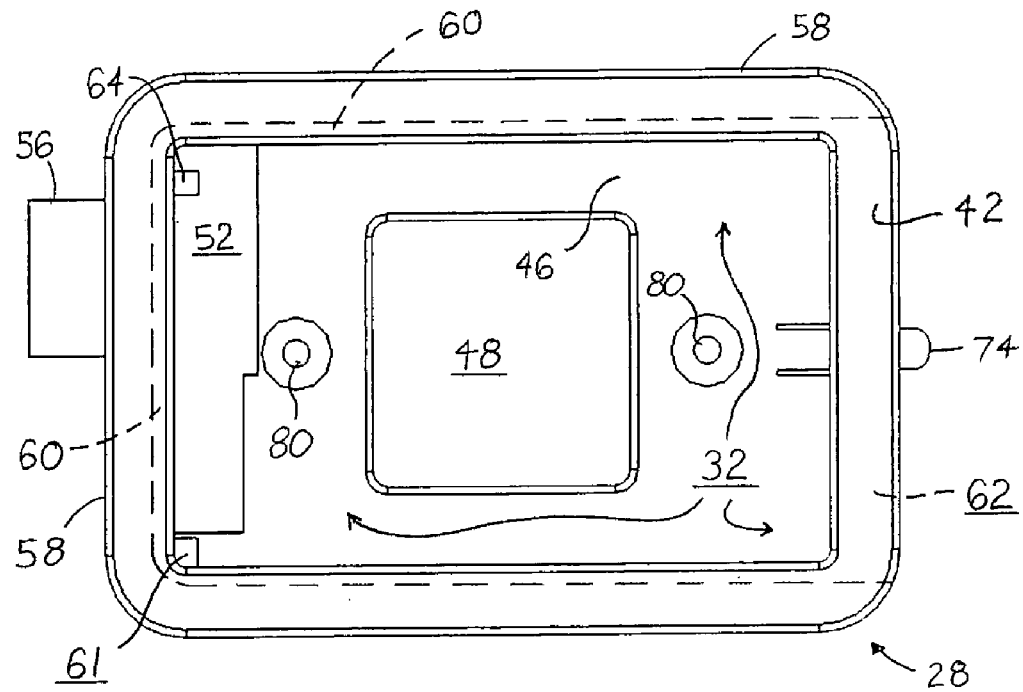
FIG. 8 is a front view of the receiver cover.
Figure 9:
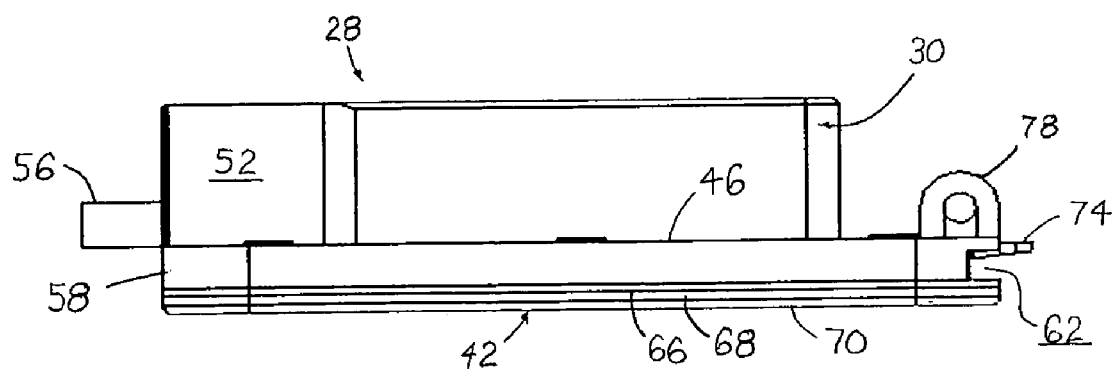
FIG. 9 is a top view of the receiver cover of FIG. 8.

Focusing now on cover plate 34a,b, two types of cover plate are shown in FIGS. 6 and 7 plate 34a having a solid illuminated image plate part 100, and plate 34b having an illuminated access plate part 102. Image plate part 100 is a generally flat plate having a back light system over which a translucent or transparent image may be placed. Access plate part 102 is similar to image plate 100, except that an access hole 104 is centrally located through the plate to line up with access hole 48 in mounting socket 30 when the plate is mounted within cover plate chamber 32. Both plates include a backing plate 106 on which a printed circuit board 108 is laminated. An electroluminescent sheet 110 is placed over board 108 and connected thereto so that the board controls the illumination of the electroluminescent sheet. In image plate part 100, an image transparency 112 is placed over the electroluminescent sheet 110, while in access plate part 102 the image transparency may be omitted. Image transparency 112 is provided to have a design or wordage printed thereon which is visible when sheet 110 is illuminated. Image transparency 112 is generally a colored plastic sheet sandwiched between peripheral frame 105 and back plate 106. A protective lens 114 is then placed over the top of either electroluminescent sheet 110 in the access plate part 102 or the image transparency 112 in the image plate part 100 in order to protect the interior layers from the exterior environment. An electrical connector 116 is located on cover plate 34a,b that is complementary to electric connector 64 carried within cover plate chamber 32. Connector 116 includes contacts that will contact the mating contacts on connector 64 when cover plate 34a,b is inserted into cover plate chamber 30. Electric power from the electric system of vehicle 10 is thereby routed to electroluminescent sheet 110 in cover plate 34a,b via the 4-flat electric connector 56, control wiring, and electric connectors 64, 116 to illuminate the electroluminescent sheet 110. In the preferred embodiment, electroluminescent sheet 110 is illuminated only when the lights of the vehicle are on.

Image plate part 100 and access plate part 102 may both be used at different times within receiver cover 28. When receiver cover 28 is mounted using adaptor 40, there is generally no need to use access plate part 102 since the adaptor prevents insertion of hitch bar tube 22 through the receiver cover anyway. However, when receiver cover 28 is mounted directly about receiver 14 using mounting bracket 36, it may be desirable to use image plate part 100 when there is no need for inserting hitch bar 20 into receiver 14. Access plate part 102 may then be used when it is desired to insert the hitch bar into the receiver. Interchanging the two plate parts 100, 102 can be quickly and easily done (when hitch bar tube 22 is not inserted through access hole 48) by sliding one cover plate out of the chamber through slot 62 and inserting the other cover plate through the slot into its chamber in its place. Latch 72 may then be locked again to prevent the cover plate from being withdrawn. Both cover plate 34a and 34b, however, will cover the heads 86 of fasteners 38 when inserted into cover plate chamber 32. Thereby cover plate 34a,b prevents access to the fasteners, which makes it difficult to remove the receiver cover 28 from receiver 14.

Figure 13:
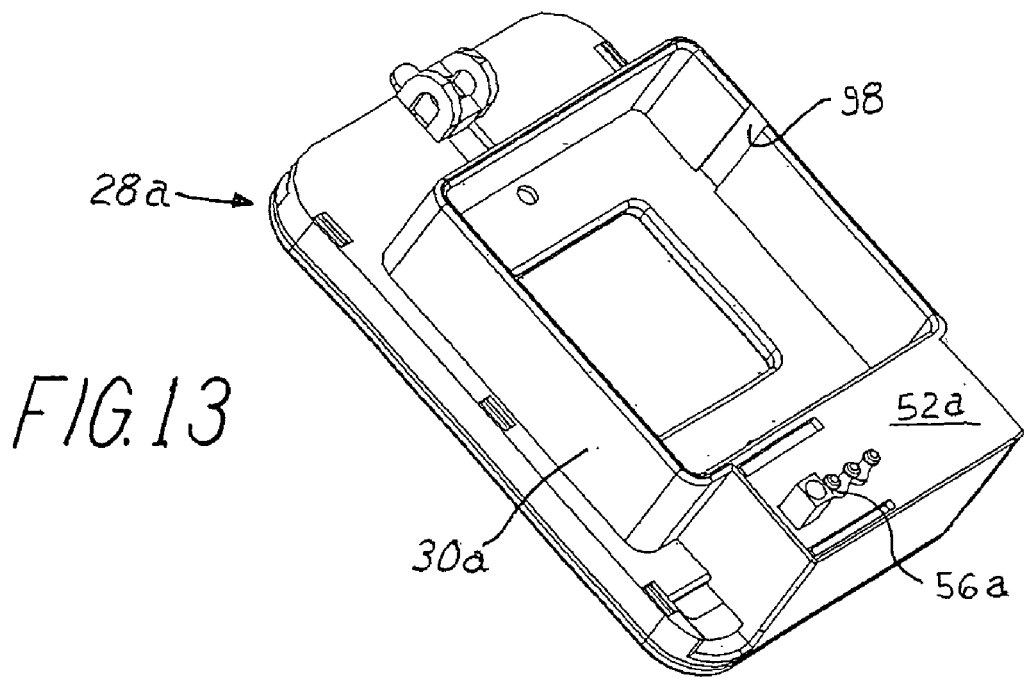
FIG. 13 is an isometric view of an alternative embodiment of a receiver cover; and, FIG. 14 is a cross sectional view of the alternative embodiment of FIG. 13.
Figure 14:
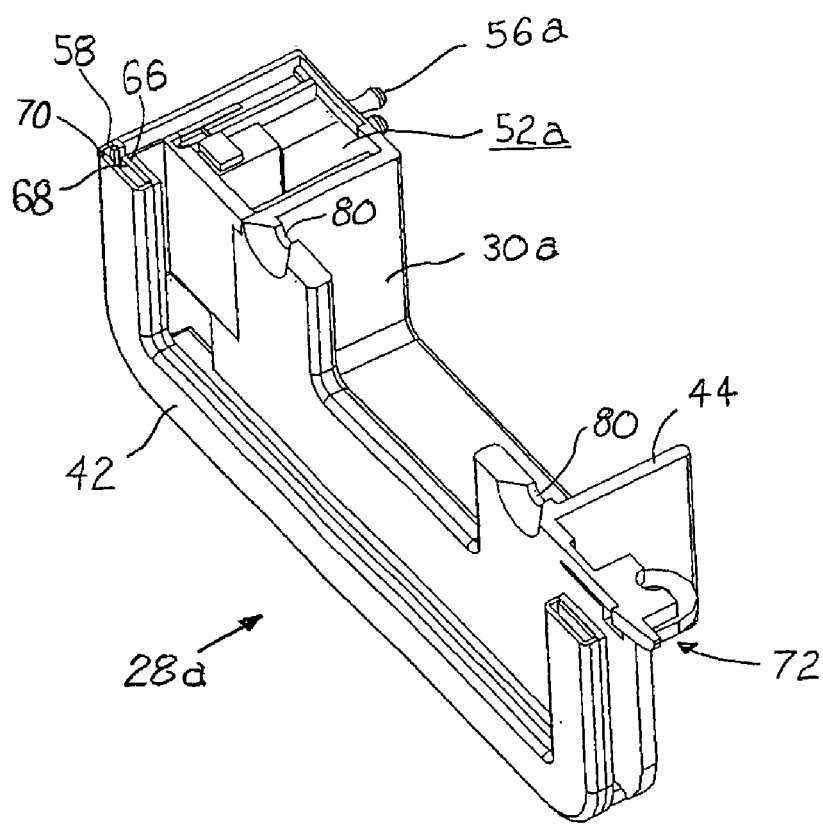

In an alternative embodiment shown in FIGS. 13 and 14 a receiver cover 28A is shown with a mounting socket 30A that does not include a spacer rib. A 4-flat electric connector 56A protrudes from the back of the electronic component chamber 52A. All other parts and their use are the same as described above.

The above description is only meant to exemplify the invention to enable others to reproduce it. The description is not intended to be a limitation from other minor and obvious variations on the embodiments described, all of which variations are expressly included herein.

We claim:

1. A cover for a hitch receiver comprising:
a mounting socket for connection to an end of said hitch receiver, said mounting socket having opposite first and second sides;
a sidewall extending outwardly from said first side of said mounting socket, said sidewall and said first side defining a chamber;
said mounting socket accommodating within said chamber a fastener for releasably fastening said mounting socket to said receiver,
a removable cover plate carried by said mounting socket, said cover plate overlying said chamber and said fastener,
said cover plate having a first opening therethrough, a second opening through said mounting socket, said first and second openings alignable with said receiver.

2. The cover of claim 1 and:
a latch carried by said mounting socket for releasably locking said plate within said chamber.

3. The cover of claim 1 and:
an adaptor between said mounting socket and said receiver, said mounting socket attached to said adaptor at said second side, said receiver being of tubular form, said adaptor fitting into said end of said receiver.

4. The cover of claim 1 and a sidewall extending from said second side of said socket, said last mentioned sidewall for fitting about said end of said receiver.

5. The cover of claim 1 wherein said cover plate is electrically illuminated.

6. The cover of claim 1 wherein said cover plate includes an electroluminescent sheet.

7. The cover of claim 6 wherein said electroluminescent sheet includes a terminal for connection to electric power of a towing vehicle.

8. The cover of claim 6 wherein said cover plate includes a decorative image transparency overlying said electroluminescent sheet.

9. The cover of claim 6 and:
a decorative image transparency over said electroluminescent sheet for defining an image when said electroluminescent sheet is illuminated.

10. A cover for a hitch receiver comprising:
a mounting socket for connection to an end of said hitch receiver, said mounting socket having opposite first and second sides;
a sidewall extending outwardly from said first side of said mounting socket, said sidewall and said first side defining a chamber;
said mounting socket accommodating within said chamber a fastener for releasably fastening said mounting socket to said receiver,
a removable cover plate carried by said mounting socket, said cover plate overlying said chamber and said fastener,
a clip for securing said mounting socket to said hitch receiver, said clip mountable about said hitch receiver adjacent said mounting socket and releasably fastened to said mounting socket by said fastener to clamp the mounting socket to the hitch receiver.

11. A cover for a hitch receiver comprising:
socket having opposite first and second sides;
a sidewall extending outwardly from said first side of said mounting socket, said sidewall and said first side defining a chamber;
said mounting socket accommodating within said chamber a fastener for releasably fastening said mounting socket to said receiver,
a removable cover plate carried by said mounting socket, said cover plate overlying said chamber and said fastener,
said chamber having an open end opposite said first side, said sidewall further defining a peripheral groove extended about said chamber and a slot through said sidewall along a portion of said peripheral groove, said cover plate slidably inserted through said slot into said peripheral groove covering said opening.

12. The cover of claim 11 and an opening in said chamber opposite said slot for accessing said cover plate when in said chamber.

13. The cover of claim 11 wherein said cover plate includes an electroluminescent sheet.

14. A cover for mounting to a hitch receiver carried by a vehicle, said cover comprising:
a mounting socket mountable to said hitch receiver,
a removable cover plate carried by said mounting socket, said cover plate including an electroluminescent sheet connectable to electric power supplied by said vehicle for lighting said electroluminescent sheet,
a second electroluminescent sheet, said second electroluminescent sheet carried by said mounting socket and connectable to said electric power supplied by said vehicle to define illuminated left and right turn signals and a brake signal corresponding to like signals actuated on said vehicle.

15. The cover of claim 14 and:
a printed circuit board carried by said cover plate for providing electric power to said electroluminescent sheets.

16. The cover of claim 14 wherein said cover plate overlays fasteners through said mounting socket.

17. A cover for mounting to a hitch receiver carried by a vehicle, said cover comprising:
a mounting socket mountable to said hitch receiver,
a removable cover plate carried by said mounting socket, said cover plate including an electroluminescent sheet connectable to electric power supplied by said vehicle for lighting said electroluminescent sheet,
said mounting socket and said cover plate each defining an aligned opening, said aligned openings providing access to said hitch receiver through said cover.

* * * * *